United States Patent
Lu et al.

(10) Patent No.: US 8,184,888 B2
(45) Date of Patent: *May 22, 2012

(54) METHOD AND SYSTEM FOR POLYP SEGMENTATION FOR 3D COMPUTED TOMOGRAPHY COLONOGRAPHY

(75) Inventors: Le Lu, East Norriton, PA (US); Adrian Barbu, Tallahassee, FL (US); Matthias Wolf, Coatesville, PA (US); Sarang Lakare, Chester Springs, PA (US); Luca Bogoni, Philadelphia, PA (US); Marcos Salganicoff, Bala Cynwyd, PA (US); Dorin Comaniciu, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 866 days.

This patent is subject to a terminal disclaimer.

(21) Appl. No.: 12/231,772

(22) Filed: Sep. 5, 2008

(65) Prior Publication Data

US 2009/0074272 A1    Mar. 19, 2009

Related U.S. Application Data

(60) Provisional application No. 60/973,497, filed on Sep. 19, 2007.

(51) Int. Cl.
G06K 9/46 (2006.01)

(52) U.S. Cl. .................................................. 382/131

(58) Field of Classification Search ............ 382/128, 382/131, 132
See application file for complete search history.

(56) References Cited

U.S. PATENT DOCUMENTS

| | | | |
|---|---|---|---|
| 6,331,116 B1 | 12/2001 | Kaufman et al. | |
| 6,514,082 B2 | 2/2003 | Kaufman et al. | |
| 6,947,784 B2* | 9/2005 | Zalis | 600/425 |
| 7,148,887 B2 | 12/2006 | Kaufman et al. | |
| 7,236,620 B1* | 6/2007 | Gurcan | 382/128 |
| 7,260,250 B2* | 8/2007 | Summers et al. | 382/128 |
| 7,272,251 B2* | 9/2007 | Acar et al. | 382/128 |
| 7,333,644 B2* | 2/2008 | Jerebko et al. | 382/128 |
| 7,379,572 B2* | 5/2008 | Yoshida et al. | 382/128 |

(Continued)

FOREIGN PATENT DOCUMENTS

WO     2004/081874 A    9/2004

(Continued)

OTHER PUBLICATIONS

Rahul Bhotika et al., "Part-Based Local Shape Models for Colon Polyp Detection," MICCAI 2006, LNCS 4191, pp. 479-486, 2006.*

(Continued)

Primary Examiner — Allen C. Ho (57) ABSTRACT

A method and system for polyp segmentation in computed tomography colonogrphy (CTC) volumes is disclosed. The polyp segmentation method utilizes a three-staged probabilistic binary classification approach for automatically segmenting polyp voxels from surrounding tissue in CTC volumes. Based on an input initial polyp position, a polyp tip is detected in a CTC volume using a trained 3D point detector. A local polar coordinate system is then fit to the colon surface in the CTC volume with the origin at the detected polyp tip. Polyp interior voxels and polyp exterior voxels are detected along each axis of the local polar coordinate system using a trained 3D box. A boundary voxel is detected on each axis of the local polar coordinate system based on the detected polyp interior voxels and polyp exterior voxels by boosted 1D curve parsing using a trained classifier. This results in a segmented polyp boundary.

29 Claims, 6 Drawing Sheets

U.S. PATENT DOCUMENTS

| | | | |
|---|---|---|---|
| 7,412,084 B2* | 8/2008 | Jerebko | 382/128 |
| 7,454,045 B2* | 11/2008 | Yao et al. | 382/128 |
| 7,480,401 B2* | 1/2009 | Shen et al. | 382/131 |
| 7,492,968 B2* | 2/2009 | Jerebko et al. | 382/300 |
| 7,558,413 B2* | 7/2009 | Tu et al. | 382/128 |
| 7,609,868 B2* | 10/2009 | Kuth et al. | 382/128 |
| 7,634,133 B2* | 12/2009 | Jerebko et al. | 382/173 |
| 2008/0211812 A1 | 9/2008 | Barbu et al. | |

FOREIGN PATENT DOCUMENTS

| | | |
|---|---|---|
| WO | 2005/017836 A | 2/2005 |

OTHER PUBLICATIONS

Hiroyuki Yoshida and Janne Näppi, "Three-Dimensional Computer-Aided Diagnosis Scheme for Detection of Colonic Polyps," IEEE Transactions on Medical Imaging, vol. 20, No. 12, pp. 1261-1274, Dec. 2001.*

J. Yao, et al., "Colonic Polyp Segmentation in CT Colonography-Based on Fuzzy Clustering and Deformable Models", IEEE, 2004.

A. Jerebko, et al., "Symmetric Curvature Patterns for Colonic Polyp Detection", MICCAI, 2006.

Mokhtarian et al., "Scale-Based Description and Recognition of Planar Curves and Two-Dimensional Shapes", IEEE Transactions on Pattern Analysis and Machine Intelligence, vol. 8, No. 1, 1986, pp. 34-43.

Almeida-Prieto et al. "Image analysis of the shape of granulated powder grains", Jounal of Pharmaceutical Sciences, vol. 93, No. 3, 2004, pp. 621-634.

You et al., "Interactive volume rendering for virtual colonoscopy", Visualization '97, Proceedings (Annual IEEE Conference on Visualization, IEEE, New York, NY, vol. CONF. 8, Oct. 19, 1997, pp. 433-436, 571.

Yao et al., "CT Colonography Computer-Aided Polyp Detection Using Topographical Height Map", Image Processing, 2007, ICIP 2007, IEEE International Conference, IEEE, Sep. 1, 2007, pp. V-21.

Barbu et al., "Hierarchical Learning of Curves Application to Guidewire Localization in Fluoroscopy", Computer Vision and Pattern Recognition, 2007, IEEE, Piscataway, NJ, Jun. 1, 2007, pp. 1-8.

Tu, "Probabilistic Boosting-Tree: Learning Discriminative Models for Classification, Recognition, and Clustering", Computer Vision, 2005,, Tenth IEEE International Conference on Beijing, China, Oct. 17-20, 2005, IEEE, vol. 2, Oct. 17, 2005, pp. 1589-1596.

Wolpert, "Stacked Generalization", Neural Networks, Elsevier Science Publishers, Barking, GB, vol. 5, No. 2, Jan. 1, 1992, pp. 241-259.

Lu et al, "Accurate polyp segmentation for 3D CT colonography using multi-staged probabilistic binary learning and compositional model", Computer Vision and Pattern Recognition, 2008, IEEE, Piscataway, NJ, Jun. 23, 2008, pp. 1-8.

Zheng et al, "Fast Automatic Heart Chamber Segmentation from 3D CT Data Using Marginal Space Learning and Steerable Features", Computer Vision, 2007, IEEE, Oct. 1, 2007, pp. 1-8.

International Search Report including Notification of Transmittal of the International Search Report, International Search Report, and Written Opinion of the International Searching Authority, dated Feb. 13, 2009.

* cited by examiner

METHOD AND SYSTEM FOR POLYP SEGMENTATION FOR 3D COMPUTED TOMOGRAPHY COLONOGRAPHY

This application claims the benefit of U.S. Provisional Application Ser. No. 60/973,497, filed Sep. 19, 2007, the disclosure of which is herein incorporated by reference.

BACKGROUND OF THE INVENTION

The present invention relates to 3D computed tomography (CT) colonography, and more particularly, to automated polyp segmentation for 3D CT colonography.

Colon cancer is the number two cause of cancer death in men and women combined, but it is one of the most preventable cancers because doctors can identify and remove precancerous growths known as polyps. 3D CT colonography (CTC), or virtual colonoscopy, is emerging as a powerful polyp screening tool because of its non-invasiveness, low cost, and high sensitivity. 3D CTC visualizes the colon, and allows a physician to navigate the colon to search for polyps. However, the physician needs to manually adjust the navigation speed and change the angle in order to see a polyp clearly. For example, a polyp may be hidden in a colonic fold and thus could be missed during the physician's visual inspection. Accordingly, there has been much research in computer aided detection (CAD) of polyps in CTC, and several such CAD systems have been proposed. Once a polyp is detected either manually or automatically, the polyp is measured and classified by a physician. However, there is a large variability in physician's measurements of polyps. Therefore, an accurate, consistent, and automated method for polyp measurement is desirable.

Polyp segmentation is defined as extracting as isolating a polyp from the colon wall at a given location. In addition to its significant value for polyp measurement in clinical practice, polyp segmentation is also important for computer aided detection of polyps. Polyp segmentation is a challenging task because polyps are abnormal growths from the colon wall and the "expected" segmentations are often a semantic, perceptual boundary with low imaging contrast support. Furthermore, there are multiple shape categories of polyps, such as sessile, pedunculated, flat, etc., with a large 3D shape/appearance variation. Conventional polyp segmentation methods utilize unsupervised segmentation or clustering in 3D data volumes. Such methods include, fuzzy clustering, deformable model or snakes, variational level-set method, and heuristic surface curvature constraints. These unsupervised approaches work well for up to 70% of polyps due to unclear polyp/nonpolyp boundaries, large within-class polyp appearance/shape variations, or limited heuristic shape assumptions. Accordingly, a polyp segmentation method having increased accuracy is desirable.

BRIEF SUMMARY OF THE INVENTION

The present invention provides a method and system for automatic polyp segmentation in 3D computed tomography colonography (CTC) volumes. Embodiments of the present invention utilize a multi-stage probabilistic learning framework for automatically segmenting polyp voxels from surrounding tissue. Embodiments of the present invention integrate low- and mid-level information for discriminative learning under local polar coordinates that are aligned on the 3D colon surface around a detected polyp.

In one embodiment of the present invention, an initial polyp position in a CTC volume is received. A polyp tip is detected in a neighborhood of the initial polyp position. The polyp tip may be detected by using a trained 3D point detector to detect polyp tip voxel candidates, which are then clustered and centered to determine a polyp tip voxel. A local polar coordinate system is then fit to a colon surface in the CTC volume with the origin of the local polar coordinate system at the detected polyp tip. Polyp interior and polyp exterior voxels are detected along each axis of the local polar coordinate system. The polyp interior and polyp exterior voxels can be detected using a trained 3D box detector. A boundary of a polyp is segmented in the CTC volume by detecting a boundary voxel for each axis of the local polar coordinate system based on the detected polyp interior and polyp exterior voxels. The boundary voxels can be detected by 1D curve parsing using a trained classifier. The segmented polyp boundary can be smoothed, and used to automatically measure the size of the segmented polyp.

These and other advantages of the invention will be apparent to those of ordinary skill in the art by reference to the following detailed description and the accompanying drawings.

DETAILED DESCRIPTION

The present invention is directed to a method for polyp segmentation in 3D computed tomography colonography (CTC) volumes. Embodiments of the present invention are described herein to give a visual understanding of the polyp segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Polyp segmentation, as performed in embodiments of the present invention, is the extraction of a polyp from a CTC volume given an initial position. The initial position can be manually selected by a physician or output by computer aided detection (CAD) software using a closed 1D boundary in the 3D CTC volume. When viewing CTC volumes to look for polyps, some physicians view the volume in 2D and some in 3D, leading to large variations in the initial positions selected. Conventional polyp detection systems (i.e., CAD programs) also generate many false alarms and predict polyp locations with limited accuracy. This large variability in the initial position of the polyp locations reduces the reliability of the initial polyp locations.

In order to compensate for such inaccuracies and inconsistencies and improve overall system performance, embodiments of the present invention provide robust, learning based polyp segmentation. In order to segment a polyp, the polyp tip is detected as a voxel on the polyp surface by a 3D point detector, followed by clustering and centering. A polar coordinate system is then constructed using the detected polyp tip as its origin with a set of evenly sampled radial axes, which are 1D curves on the colon surface. The polyp boundary learning is performed along these 1D sampling axes using two-layered stacking learning using a 3D box detector and 1D curve parsing detector to effectively determine which portion of the curve is polyp and which portion of the curve is non-polyp. The binary probabilistic boundary decisions on all 1D curves/axes are assembled jointly based on their axis connectivity in the polar coordinates to generate a complete 3D polyp segmentation.

Figure 1A:
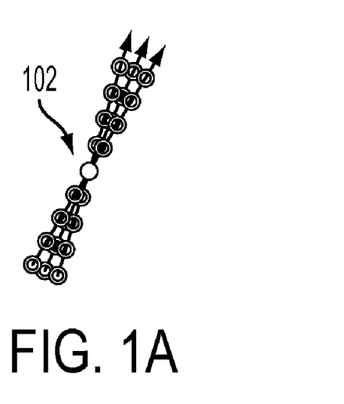
FIG. 1 illustrates patterns for generating steerable features for polyp segmentation.
Figure 1B:
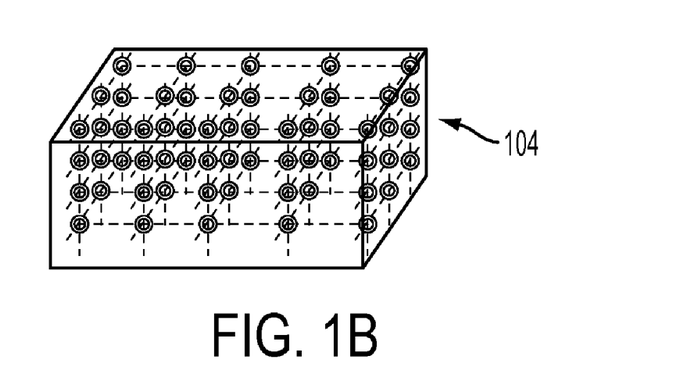

The hierarchical, multistage probabilistic boosting learning framework used by embodiments of the present invention relies on a large pool of features, which are extracted from colon surfaces under local-to-global scales. In particular, steerable features can be used to train detectors utilized by embodiments of the present invention. FIG. 1 illustrates patterns for generating steerable features for polyp segmentation. As illustrated in FIG. 1, image (a) illustrates an axis-based pattern 102 for polyp tip detection. Assuming that the sampling pattern 102 is placed with its center grid at any given voxel v, the sampling pattern 102 contains three sampling axes as the gradient directions calculated in v's neighborhood under three scales, respectively. Along each axis, nine grids are evenly sampled and 71 intensity, gradient, and curvature based local features are calculated for each grid. This process is repeated for half and quarter downsampled CT volumes. Altogether, this results in M=81=3×9×3 grid nodes, which brings 71×81=5751 features. Image (b) of FIG. 1 illustrates a box-based pattern 104 used for polyp interior/exterior material/texture classification. For the box-based sampling pattern 104, there are 7×7×5 sampling grids under each volume scale. This results in a total of 52185 features. A classifier trained using the axis-based pattern 102 and a probabilistic boosting tree (PBT) is referred to herein as a 3D point detector, while a classifier trained using the box-based pattern 104 and a PBT is referred to herein as a 3D box detector.

In polyp boundary detection, 400 parsing based features can be used for feature selection. According to embodiments of the present invention, the hierarchical multi-stage learning-based polyp segmentation can be implemented using three learning steps, in which the polyp-class probabilistic training examples are collected and grouped from a voxel-level detector (for polyp tip voxels), to a box-level detector (for boxes of polyp interior material), to a curve-parsing detector using stacking probabilities generated by the box-level detector. This local-to-global, class-conditional framework results in robust and accurate polyp segmentation.

Figure 2:
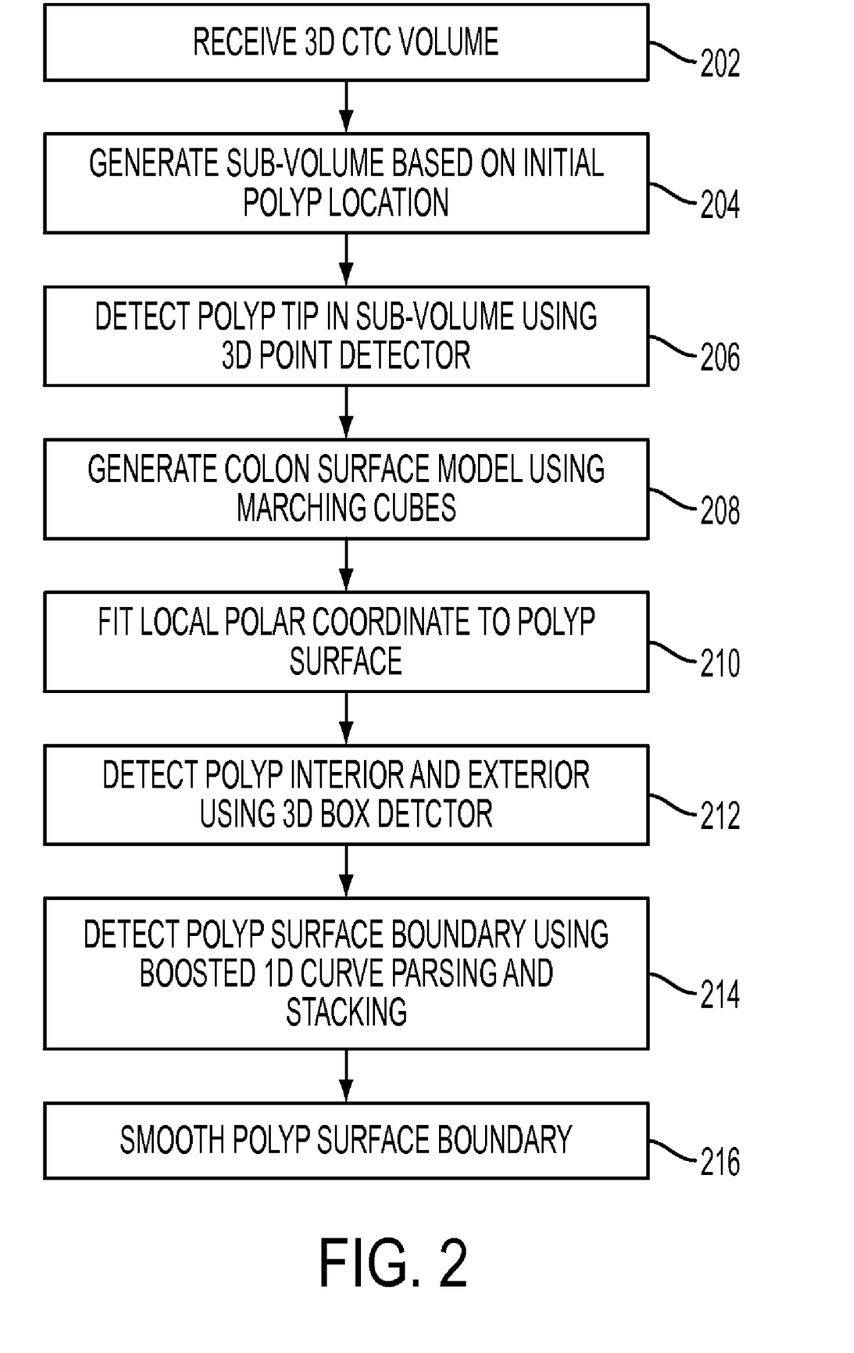
FIG. 2 illustrates a method for segmenting a polyp in a 3D CTC volume according to an embodiment of the present invention.
Figure 3A:
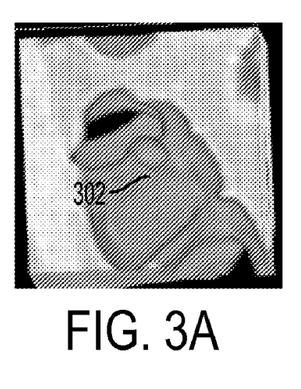
FIG. 3 illustrates exemplary results of steps 204-208 of the polyp segmentation method of FIG. 2.
Figure 3B:
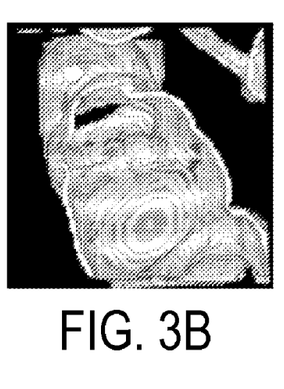
Figure 3C:
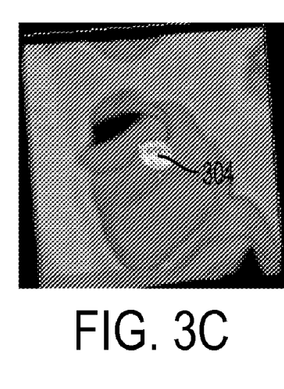
Figure 3D:
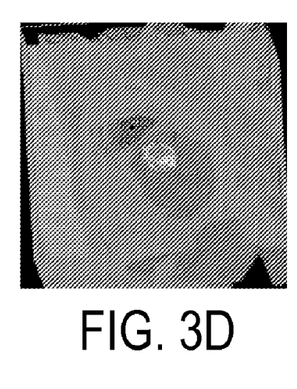

FIG. 2 illustrates a method for segmenting a polyp in a 3D CTC volume according to an embodiment of the present invention. As illustrated in FIG. 2, at step 202, a 3D CTC volume is received. The CTC volume can be received directly from an image acquisition device, or can be received by loading a CTC volume stored in memory, storage, or other computer readable medium of a computer system. The CTC volume can be used for training or testing. CTC volumes used for training can be annotated.

At step 204, a sub-volume of the 3D CTC volume is generated based on an initial polyp location in the 3D CTC volume. The sub-volume is a polyp region generated based on an initial polyp location. The initial polyp location can be manually selected, for example by a physician using an input device, such as a mouse. Alternatively, the initial polyp location can be a polyp detection result of a CAD system. The sub-volume is generated by extracting a 3D polyp region surrounding the initial polyp location. For example, the sub-volume can be an 81×81×81 voxel region surrounding the initial polyp location. FIG. 3 illustrates exemplary results of steps 204-208 of the polyp segmentation method of FIG. 2. Image (a) of FIG. 3 is a slice of CTC sub-volume. The CTC sub-volume shows an initial polyp location 302 output from a CAD system. As shown in image (a), the initial polyp location 302 is located at the center of the CTC sub-volume.

Returning to FIG. 2, at step 206, a polyp tip is detected in the sub-volume using a 3D point detector. The polyp tip is defined herein as a colon surface voxel inside the polyp region (sub-volume), and reasonable close to the center of the polyp region. Since the polyp tip is defined as a colon surface voxel, the search domain for the polyp tip can be limited to the domain of surface voxels (i.e., voxels with non-zero gradients). In order to extract the domain of surface voxels, a gradient surface can be generated, for example using 3D Canny edge detection. Image (b) of FIG. 3 shows the voxel-based gradient surface generated from image (a) using 3D Canny edge detection. Once the surface voxels are extracted by generating the gradient surface, the polyp tip detection can be performed by classification of surface voxels as polyp tip voxel candidates, and clustering and centering the polyp tip voxel candidates to determine the polyp tip voxel.

For training a 3D point detector for polyp tip detection, neighboring surface voxels ($\{v\}$: $dist(\tau, v) < l_1$) with Euclidean distances less than a predefined metric $l_1$ from the labeled polyp tip position $\tau$ for each polyp in the training set, are selected as positive training samples. Other surface voxels ($\{v\}$: $dist(\tau, v) > l_2$) with relative Euclidean distances larger than $l_2$ are selected as negative training samples. The condition $l_1 < l_2$ is enforced so that the trained classifier is forced to distinguish centrally located polyp voxels from non-polyp voxels. A 3D point detector is trained to solve this classification problem. The 3D point detector can be a probabilistic boosting tree (PBT) classifier trained using the axis-based steerable features described above and shown in image (a) of FIG. 1. A PBT classifier is trained by recursively constructing a tree, where each of the nodes represents a strong classifier. Once the strong classifier of each node is trained, the input training data for the node is classified into two sets (positives and negatives) using the learned strong classifier. The two new sets are fed to left and right child nodes respectively to train the left and right child nodes. In this way, the PBT classifier is constructed recursively. The trained classifier (3D point detector) is denoted herein as $PBT_1$.

The trained 3D point detector ($PBT_1$) is used to detect polyp tip voxel candidates from the surface voxels of the sub-volume. Accordingly, once $PBT_1$ is learned, $PBT_1$ determines a positive-class probability value $prob(v)$ (from 0 to 1) for each surface voxel v of the sub-volume. If $prob(v) > T_1$ for a voxel, where $T_1$ is a first threshold value, then the voxel is classified as a polyp tip voxel candidate. Image (c) of FIG. 3 shows detected polyp tip voxel candidates 304 in a CTC sub-volume.

From all the detected polyp tip voxel candidates $(S\{v\}=\{v\}: prob(v)>T_1)$ in a volume (or sub-volume), one voxel is detected as the polyp tip voxel by clustering and centering. The first threshold value $T_1$ can be determined based on receiver operating characteristics (ROC) of the trained PBT classifier ($PBT_1$). Connected component analysis is applied to partition the set $S\{v\}$ into a list of n clusters $C_1\{v\}, C_2\{v\}, \ldots, C_n\{v\}$. For each of the clusters, a fitness score $P_i=\Sigma_{v\in C_i\{v\}}\{prob(v)\}$, i=1, 2, ..., n is calculated, reflecting the overall fitness of that class being a positive polyp tip class. The cluster with the maximal fitness score is selected: $C_j\{v\}$ where $P_j \geq P_i$, i=1, 2, ..., n, and the other clusters are discarded. According to a possible implementation, a 3D multivariate normal distribution based spatial prior $G(v(x,y,z)|\mu, \Sigma)$ can be integrated into $P_i$ to reflect the confidence of the initial polyp position input µ for the CAD system or manual selection. The geometric mean $\bar{\mu}(x, y, z)$ of the winning cluster $C_j\{v(x, y, z)\}$ is calculated and projected to the colon surface by finding $\bar{v}$ where $dist(\bar{v}, \bar{\mu}) \leq dist(v, \bar{\mu})$ and $v \in S\{v\}$. $\bar{v}$ is the detected polyp tip voxel. The detected polyp tip voxel $\bar{v}$ is detected by integrating PBT learned class-conditional information from local (i.e., polyp tip 3D point detection) to semi-global scale (i.e., clustering and centering).

Returning to FIG. 2, at step 208, a colon surface model is generated. The colon surface model can be generated using the Marching Cubes algorithm. The Marching Cubes algorithm is a well known method of constructing a polygonal mesh of an isosurface from a 3D field of scalar values or voxels (i.e., a 3D volume) in both medical and geological scans. The Marching Cubes algorithm subdivides a 3D volume space into a series of small cubes. The algorithm then "marches" through each of the cubes by testing the fitness of the current set of corner points against the predefined 15 configurations, and replaces the cube with an appropriate set of polygons. A global mesh is then generated by fusing all the cube polygons while enforcing a smoothness constraint. Since the gradient of the scalar field at each voxel is also the normal vector of a hypothetical isosurface passing from that point, these normals can be interpolated along the edges of each cube to calculate the normals of all the generated vertices. Referring to FIG. 3, image (d) shows a mesh-based CTC colon surface model generated from the sub-volume of image (a) using the Marching Cubes algorithm.

Figure 4A:
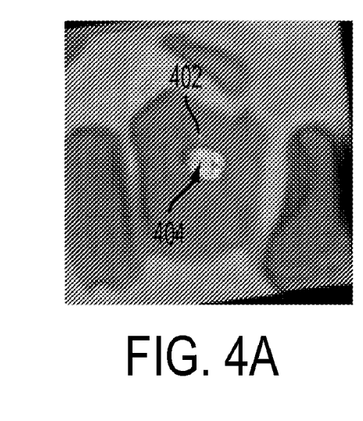
FIG. 4 illustrates exemplary results of fitting a local polar coordinate system to a colon surface of a CTC sub-volume.
Figure 4B:
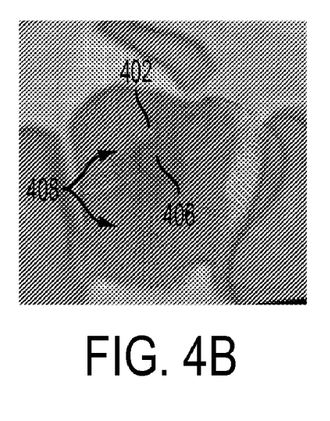

Returning to FIG. 2, at step 210 a local polar coordinate system is fit to the colon surface. Once the mesh-based colon surface is generated, the polyp tip t is identified as the closest vertex on the mesh from $\bar{v}$. Accordingly, $\bar{v}$ is transferred onto the mesh as t. The local polar coordinate system is generated using t as its origin. Given a normal vector $n_t$ at t, two other axes which are orthogonal to $n_t$ are defined. In theory, the configuration of these two axes is not unique (i.e., they can be any two axes in $n_t$ s orthogonal plane $P_t$ passing through t which are mutually orthogonal as well), but embodiments of the present invention fix this configuration by enforcing one axis (Y) passing through the intersection point of $P_t$ and a predefined line vector, such as [1,0,z], where z is an arbitrary value. $n_t$ is denoted as axis X, another axis constrained as Y, and axis Z is calculated as the cross product of x and Y. The cutting planes $P_n$ are defined as planes passing through $n_t$ or X, and another line segment Y' in $P_t$ which evenly rotates from Y in a clockwise direction. The axes of the final constructed polar coordinates are the intersected curves between $P_n$ and the colon surface mesh. The coordinates on each are defined based on their geodesic distances from t (the origin) on the corresponding cutting curve or axis. The total number of axes is set as I, and they are spatially ordered in a loop. Axis i is adjacent to axes mod(i−1, I) and mod(i+1, I). FIG. 4 illustrates exemplary results of fitting a local polar coordinate system to a colon surface of a CTC sub-volume. As illustrated in FIG. 4, image (a) is a slice of a CTC sub-volume showing the initial polyp location 402, which is the center of the sub-volume, and the polyp tip voxel candidates 404 detected by the 3D point detector. Image (b) shows the detected final polyp tip 406 and the polar coordinates 408 fit to the sub-volume.

The fitting of a local polar coordinate system, which is a spatially ordered collection of 1D curve axes, is used to represent the 3D polyp surface due to the flexibility and convenient formulation to parameterization. Compared to Conformal mapping, no user indentified 3D-2D correspondences are needed and there is no constraint on 3D surface with disk topology. Furthermore, this representation, which uses a collection of 1D curves as sampling coordinates to model the 3D colon surface shape, decreases the intrinsic dimensionality problem (i.e., 1D vs. 3D modeling). This decomposable formulation makes it feasible to construct or model a large variety of 3D shapes using an assembly of simple 1D curves that are learnable and flexible.

Returning to FIG. 2, at step 212, polyp interior and exterior voxels are detected using a structural 3D box detector. For training the 3D box detector, from annotated polyp boundaries $B_i$, i=1, 2, ..., I on polar coordinates, the voxels along each axis of the local polar coordinate system can be labeled as positive class (i.e., voxels lying inside the polyp boundary $(S_p\{v_{ij}\}=\{v_{ij}\}:(PC(v_{ij})\leq B_i-\epsilon))$), or negative class (i.e., voxels lying outside of the polyp boundary $(S_n\{v_{ij}\}=\{v_{ij}\}:(PC(v_{ij})\geq B_i-\epsilon))$). $PC(v_{ij})$ is the polar coordinates value for any voxel $v_{ij}$ on the ith axis, $B_i$ is the polar coordinates of the labeled boundary point on the same axis, and $\epsilon$ is a small value to keep a distance margin between $S_p$ and $S_n$ for learnability. This binary learning tree problem is solved by training a PBT based classifier, referred to herein as $PBT_2$, with the 3D box based steerable features illustrated in image (b) of FIG. 1. Boxes are centered at each voxel and aligned with the local gradient surface. Compared with the 3D point detector $PBT_1$ used for polyp tip detection, the 3D box detector $PBT_2$ contains more structural information within a larger neighboring spatial span.

Figure 5A:
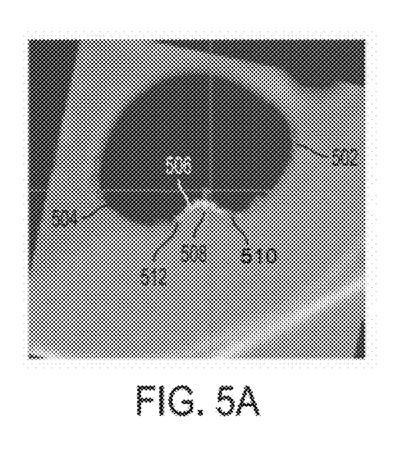
FIG. 5 illustrates exemplary polyp interior and exterior detection results.
Figure 5B:
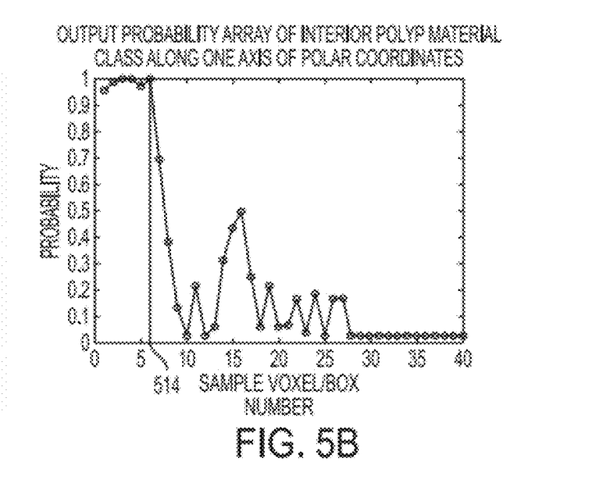

The trained 3D box detector $PBT_2$ is used to detect voxels within the polyp by classifying voxels along each polar coordinate axis as polyp interior or polyp exterior voxels. For each voxel, a polyp interior class-conditional probability is calculated representing the probability that the voxel is a polyp interior voxel. FIG. 5 illustrates exemplary polyp interior and exterior detection results. As illustrated in FIG. 5, image (a) shows a slice of a CTC sub-volume along a cutting plane defined by the local polar coordinates. Image (a) shows the polyp interior class-conditional probability responses along two exemplary polar coordinate axes 502 and 504 inside the cutting plane. The higher probabilities are shown as surface voxels 506 having whiter intensities. The intersection of the normal vector 508 at the origin of the local polar coordinates and the axes 502 and 504 is at the origin of the local polar coordinate system. Annotated polyp interior/exterior boundaries 510 and 512 are shown on the polar coordinate axes 502 and 504, respectively. Image (b) shows a plot of polyp interior class-conditional probability responses on the axis 502 of image (a) from the origin of the local polar coordinate system. The location of the annotated polyp boundary 510 in image (a) is shown at 514 in image (b).

Returning to FIG. 2, at step 214, the polyp surface boundary is detected using boosted 1D curve parsing and stacking. In order to detect the polyp boundary, this step is treated as a statistical curve parsing problem of finding polyp/nonpolyp breaking points on 1D curves. Given the output probabilities from the polyp interior/exterior detection (step 212), another layer of boundary boosting learning is applied, based on the theory of stacked generality. This is equivalent to learning a new classifier in the embedded, semantic space learned by the 3D box detector (as a wrapped) in the previous step. To learn the true polyp boundary of 1D vectors of noisy values, the coordinates along each axis are labeled as positive class (i.e., coordinates within a small distance threshold distance threshold of the annotated boundary $S_+\{v_{ij}\}=\{v_{ij}\}:(B_t-\epsilon_1)\leq PC(v_{ij}) \leq (B_t+\epsilon_1))$ or, negative class (i.e., coordinates outside of the small distance threshold of the annotated boundary $S_-\{v_{ij}\}=\{v_{ij}\geq(B_t+\epsilon_2))||(PC(v_{ij})\leq(B_t-\epsilon_2)))$. $\epsilon_2 > \epsilon_1$ can be set to keep the distance margin $(\epsilon_2-\epsilon_1)>0$ between $S_+$ and $S_-$ for reducing learning ambiguity.

From $S_+$ and $S_-$, $v_{ij}$s probability value $p_{ij}$ is evaluated using $PBT_2$. Thus, an array of $\{p_{ij}\}$ is obtained on each axis i as $A(p_{ij})=(p_{i1}, p_{i2}, p_{i3}, \ldots, p_{ij}, \ldots)$. Then the following features are calculated for according to each $v_{ij}$ or $p_{ij}$ from $A_f(p_{ij})=(p_{i1}, p_{i2}, p_{i3}, \ldots, p_{ij})$ and $A_b(p_{ij})=(p_{i,j+1}, p_{i,j+2}, p_{i,j+3}, \ldots)$ respectively, for two-class PBT learning:

1) probability count features: the count of p s above a threshold θ in array $A_f$ or $A_b$; and
2) probability gap features: the size vector of the largest gaps of the θ-threshold probability array for $A_f$ or $A_b$, sorted in decreasing order.

$A_f(p_{ij})$ represents $p_{ij}$s forward array spatially from origin to $v_{ij}$, and $A_b(p_{ij})$ represents $p_{ij}$s backward array spatially from $v_{i,j+1}$ to end. The θ-threshold probability array means replacing every element p in $A_f$ or $A_b$ with 0 if p<θ and 1 if p≧0. The gap size is the count of continuous 0's. It is possible to set θ=i×0.05, i=0, 1, ... 19 and the size of gap vectors to be 20 for each θ. If there are less than 20 existing gaps, 0 can be used to fill up the 20-element vector. Therefore a total of 440=(20+20×20)×2 features are calculated as the feature selection pool for PBT learning. These features are used to train a PBT-based classifier. The resulting classifier is denoted herein as $PBT_3$.

Figure 6A:
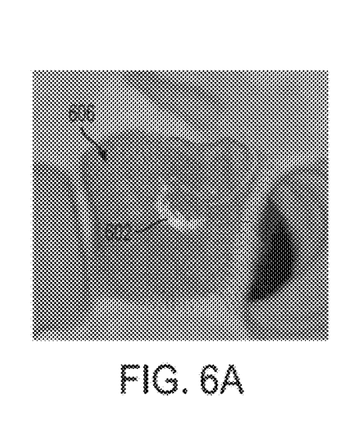
FIG. 6 illustrates two-layered polyp boundary segmentation of steps 212 and 214 of the polyp segmentation method of FIG. 2.
Figure 6B:
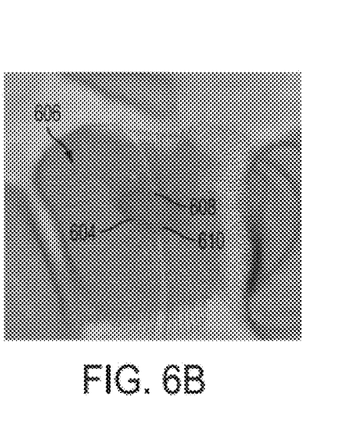

Using the trained classifier $PBT_3$, a new probability value $p_{ij}$ is calculated for each voxel $v_{ij}$ on the local polar coordinates by evaluating its forward and backward probability arrays $A_f(p_{ij})$ and $A_b(p_{ij})$ output by $PBT_2$. To determine a unique boundary point on any axis i, $v_{ik_i}$ is selected with $p_{ik_i}=\max\{p_{i1}, p_{i2}, p_{i3}, \ldots, p_{ij}, \ldots\}$. Accordingly, a boundary voxel $v_{ik_i}$ is detected for each polar coordinate axis, and the set of boundary voxels define a boundary of the polyp. FIG. 6 illustrates the two-layered polyp boundary segmentation of steps 212 and 214. As illustrated in FIG. 6, image (a) shows the polyp interior class probability response map on the polyp surface, with voxels 602 having higher probabilities shown as whiter intensities. Image (b) shows the segmented polyp boundary contour 604 overlayed on the local polar coordinate system 606. Image (b) also shows segments 608 and 610 representing the two main axes for polyp dimensioning.

Figure 7A:
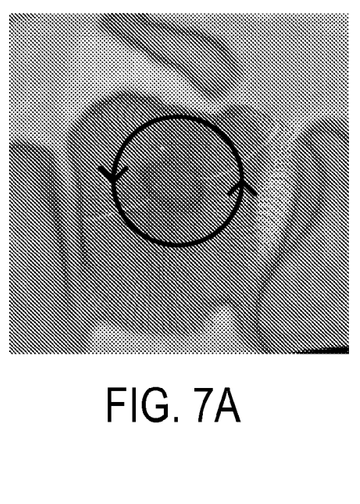
FIG. 7 illustrates an example of the looped trellis structure of the local polar coordinate system.
Figure 7B:
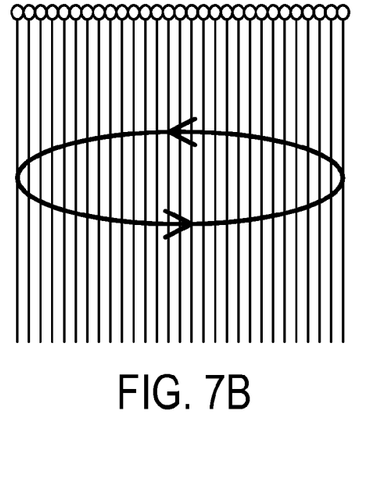
Figure 8A:
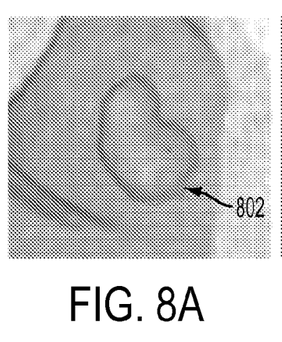
FIG. 8 illustrates exemplary polyp segmentation results using the method of FIG. 2.
Figure 8B:
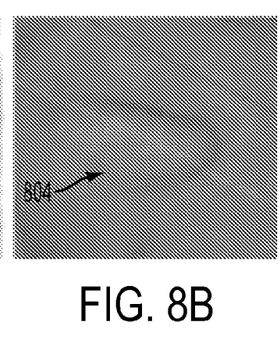
Figure 8C:
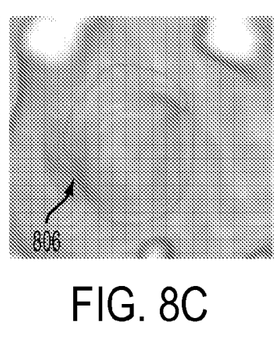
Figure 8D:
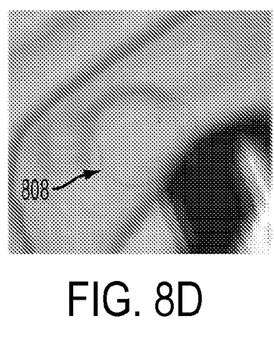
Figure 8E:
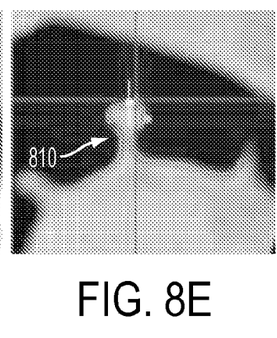
Figure 8F:
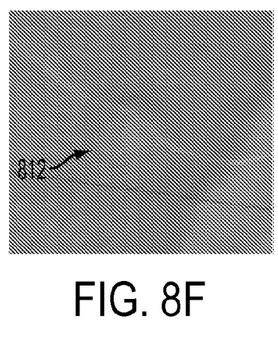

Returning to FIG. 2, at step 216, the segmented polyp surface boundary is smoothed. Assuming that the selection of each $v_{ik_i}$ is solely based on $\{p_{i1}, p_{i2}, p_{i3}, \ldots, p_{ij}, \ldots\}$ and independent with respect to the formation on other axes, the final polyp segmentation boundary will be rugged by sequentially connecting $v_{1k_1}, v_{2k_2}, \ldots$, on all axes of the local polar coordinates. For smoothness, these boundary decisions can be assembled using Gaussian blurring over their polar coordinates values $PC(v_{1k_1}), PC(v_{2k_2}), \ldots$, according to neighborhoods of successive axes. Alternatively, Viterbi-like dynamic programming can be utilized to solve this sequential smoothing problem with a looped trellis structure. Another possible smoothing solution is loopy belief propagation, which treats the local polar coordinates as a general looped 2D graph. FIG. 7 illustrates an example of the looped trellis structure of the local polar coordinate system. As illustrated in FIG. 7, image (a) shows the loopy structure of the axes of the local polar coordinates overlayed on the polyp surface, and image (b) shows the equivalent looped sequential trellis or looped 2D graph topology. Gaussian blurring is indeed a spatially homogenous smoothing filter, while Viterbi and loopy belief propagation are non-homogenous functions by building pairwise content-sensitive potential functions. All three smoothing approaches function as assemblers of propagating 1D axis segmentations across neighboring axes in polar coordinates.

The method of FIG. 2 results in a smoothed segmented polyp boundary. The segmented polyp can be output. For example, the segmented polyp boundary can be displayed as an image, such as on a display device of a computer system, stored on a storage, memory, or other computer readable medium. A physician can use such segmentation results for diagnostic and medical purposes, for example for polyp removal or diagnosis of colon cancer. FIG. 8 illustrates exemplary polyp segmentation results using the method of FIG. 2. As illustrated in FIG. 8, the segmentation method can be used to segment various shape categories of polyps. Images (a) and (b) show segmentation results 802 and 804 for sessile polyps. Image (c) shows segmentation results 806 for a mass polyp. Image (d) shows segmentation results 808 for a polyp on a fold. Image (e) shows segmentation results 810 for a pedunculated polyp. Image (f) shows segmentation results 812 for a flat polyp.

The segmented polyp boundary can also be used to automatically calculate polyp measurements. After the polyp boundary is segmented for a polyp, a set of positive polyp surface voxels (with their associated probabilities p) inside the segmented polyp boundary can be enumerated. It is then straightforward to calculate the polyp dimensions. A pair of positive voxels $v^{11}, v^{12}$ are detected with the maximal Euclidean distance from each other to define a first polyp axis. Using the distance $dist(v^{11}, v^{12})$ as the estimated polyp size, other pairs of voxels $v^2, v^2$ that are orthogonal to $v^{11}, v^{12}$ (i.e., $(v^{2'}, v^{2''}) \oplus (v^{11}, v^{12})=0$). A pair of voxels $v^{21}, v^{22}$ are then selected from the orthogonal voxels $v^2, v^2$ with the maximal Euclidean distance from each other as the second polyp axis. A third polyp axis can also be calculated by similarly calculating a third orthogonal axis. The detected polyp axes are used to calculate the size of the polyp.

Figure 9:
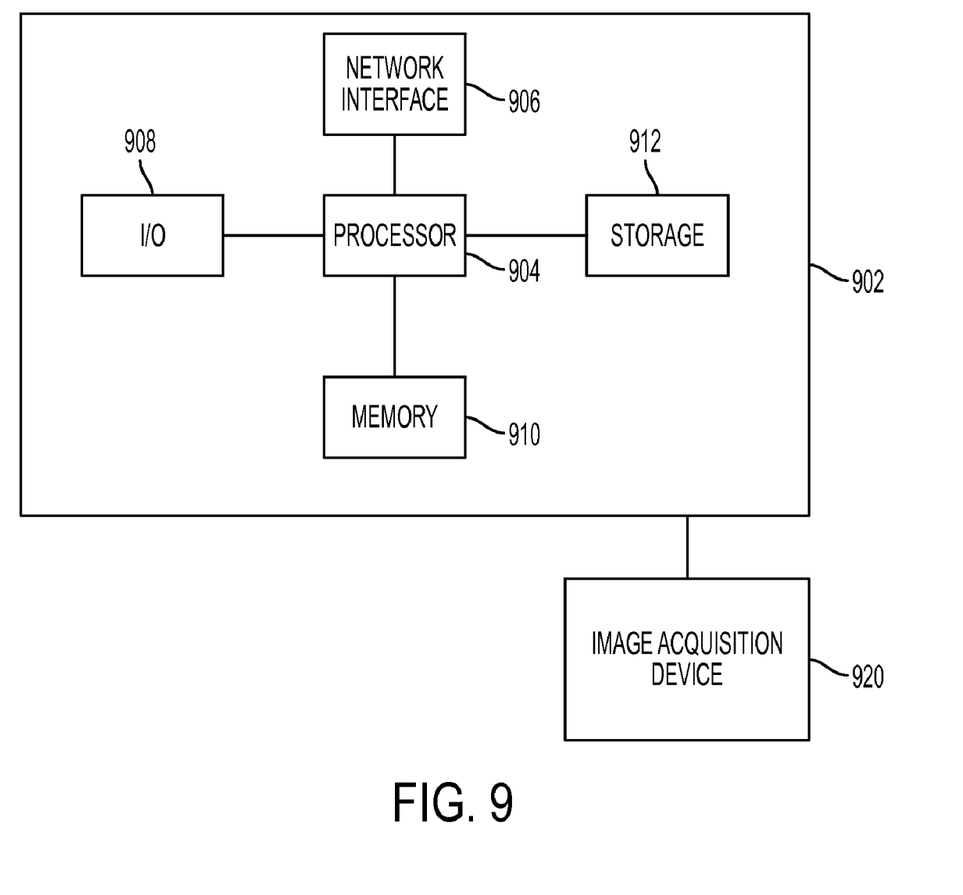
FIG. 9 is a high level block diagram of a computer capable of implementing the present invention.

The above-described polyp segmentation methods may be implemented on a computer using well-known computer processors, memory units, storage devices, computer software, and other components. A high level block diagram of such a computer is illustrated in FIG. 9. Computer 902 contains a processor 904 which controls the overall operation of the computer 902 by executing computer program instructions which define such operation. The computer program instructions may be stored in a storage device 912, or other computer readable medium (e.g., magnetic disk), and loaded into memory 910 when execution of the computer program instructions is desired. Thus, the steps of the method of FIG. 2, may be defined by the computer program instructions stored in the memory 910 and/or storage 912 and controlled by the processor 904 executing the computer program instructions. Furthermore, the classifiers trained by the above described methods and the segmentation results achieved by the above described methods can be stored in the memory 910 and/or storage 912. An image acquisition device 920, such as a CT scanning device, can be connected to the computer 902 to input 3D CTC volumes to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.) One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for segmenting a polyp in a computer tomography colonography (CTC) volume, comprising:
   receiving an initial polyp position in a CTC volume;
   detecting a polyp tip in a neighborhood of the initial polyp position;
   fitting a local polar coordinate system to a colon surface in the CTC volume based on the detected polyp tip, the local polar coordinate system including a plurality of axes;
   detecting polyp interior and polyp exterior voxels along each of the plurality of axes of the local polar coordinate system; and
   segmenting a boundary of a polyp in the CTC volume by detecting a boundary voxel for each of the plurality of axes of the local polar coordinate system based on the detected polyp interior and polyp exterior voxels.

2. The method of claim 1, further comprising:
   generating a sub-volume of a polyp region of the CTC volume centered at the initial polyp position.

3. The method of claim 1, wherein said step of detecting a polyp tip comprises:
   detecting polyp tip voxel candidates from colon surface voxels of the CTC using a trained 3D point detector;
   clustering the polyp tip candidate voxels into a plurality of clusters;
   calculating a fitness score for each of the clusters based on probabilities determined by the 3D point detector for the polyp tip voxel candidates in each cluster;
   determining the geometric mean of the cluster with the maximal fitness score; and
   projecting the geometric mean to a voxel on the colon surface.

4. The method of claim 3, wherein the trained 3D point detector is a probabilistic boosting tree (PBT) classifier trained using axis-based steerable features.

5. The method of claim 1, wherein said step of fitting a local polar coordinate system to a colon surface in the CTC volume based on the detected polyp tip comprises:
   generating a colon surface model in the CTC volume; and
   fitting the local polar coordinate system to the colon surface model with an origin of the local polar coordinate system at the detected polyp tip.

6. The method of claim 1, wherein the axes of the local polar coordinate system are a spatially ordered set of 1D curve axes.

7. The method of claim 1, wherein said step of detecting polyp interior and polyp exterior voxels along each of the plurality of axes of the local polar coordinate system comprises:
   determining a probability of a voxel being in the polyp for each voxel along each axes of the local polar coordinate system using a trained 3D box detector.

8. The method of claim 7, wherein the trained 3D box detector is a probabilistic boosting tree (PBT) classifier trained using box-based steerable features.

9. The method of claim 7, wherein said step of segmenting a boundary of a polyp in the CTC volume by detecting a boundary voxel for each of the plurality of axes of the local polar coordinate system based on the detected polyp interior and polyp exterior voxels comprises:
   detecting a boundary voxel for each axis of the local polar coordinate system based on the probabilities determined by the trained 3D box detector by boosted 1D curve parsing using a trained classifier; and
   stacking the detected boundary voxels to generate the boundary of the polyp.

10. The method of claim 9, wherein the trained classifier is a probabilistic boosting tree (PBT) classifier trained using probability count features and probability gap features based on the probabilities determined by the 3D box detector.

11. The method of claim 1, further comprising:
   smoothing the segmented boundary of the polyp.

12. The method of claim 11, wherein said step of smoothing the segmented boundary of the polyp comprises:
   smoothing the segmented boundary of the polyp using one of Gaussian blurring, dynamic programming with a looped trellis structure, and loopy belief propagation.

13. The method of claim 1, further comprising:
   measuring a size of the polyp based on the segmented boundary of the polyp.

14. The method of claim 13, wherein said step of measuring a size of the polyp based on the segmented boundary of the polyp comprises:
   detecting a first pair of voxels on the segmented boundary of the polyp separated by a maximal distance, the first pair of voxels defining a first polyp axis; and
   detecting candidate pairs of voxels on the segmented boundary of the polyp defining a segment that is perpendicular to the first polyp axis; and
   selecting one of the candidate pair of voxels separated by a maximal distance as a second pair of voxels defining a second polyp axis.

15. An apparatus for segmenting a polyp in a computer tomography colonography (CTC) volume, comprising:
   means for receiving an initial polyp position in a CTC volume;
   means for detecting a polyp tip in a neighborhood of the initial polyp position;
   means for fitting a local polar coordinate system to a colon surface in the CTC volume based on the detected polyp tip, the local polar coordinate system including a plurality of axes;
   means for detecting polyp interior and polyp exterior voxels along each of the plurality of axes of the local polar coordinate system; and means for segmenting a boundary of a polyp in the CTC volume by detecting a boundary voxel for each of the plurality of axes of the local polar coordinate system based on the detected polyp interior and polyp exterior voxels.

16. The apparatus of claim 15, wherein said means for detecting a polyp tip comprises:
   means for detecting polyp tip voxel candidates from colon surface voxels of the CTC using a trained 3D point detector;
   means for clustering the polyp tip candidate voxels into a plurality of clusters;
   means for calculating a fitness score for each of the clusters based on probabilities determined by the 3D point detector for the polyp tip voxel candidates in each cluster;
   means for determining the geometric mean of the cluster with the maximal fitness score; and
   means for projecting the geometric mean to a voxel on the colon surface.

17. The apparatus of claim 15, wherein said means for fitting a local polar coordinate system to a colon surface in the CTC volume based on the detected polyp tip comprises:
   means for generating a colon surface model in the CTC volume; and
   means for fitting the local polar coordinate system to the colon surface model with an origin of the local polar coordinate system at the detected polyp tip.

18. The apparatus of claim 15, wherein said means for detecting polyp interior and polyp exterior voxels along each of the plurality of axes of the local polar coordinate system comprises:
   means for determining a probability of a voxel being in the polyp for each voxel along each axes of the local polar coordinate system using a trained 3D box detector.

19. The apparatus of claim 18, wherein said means for segmenting a boundary of a polyp in the CTC volume by detecting a boundary voxel for each of the plurality of axes of the local polar coordinate system based on the detected polyp interior and polyp exterior voxels comprises:
   means for detecting a boundary voxel for each axis of the local polar coordinate system based on the probabilities determined by the trained 3D box detector by boosted 1D curve parsing using a trained classifier; and
   means for stacking the detected boundary voxels to generate the boundary of the polyp.

20. The apparatus of claim 15, further comprising:
   means for smoothing the segmented boundary of the polyp.

21. The apparatus of claim 15, further comprising:
   means for measuring a size of the polyp based on the segmented boundary of the polyp.

22. A non-transitory computer readable medium encoded with computer executable instructions for segmenting a polyp in a computer tomography colonography (CTC) volume, the computer executable instructions defining steps comprising:
   receiving an initial polyp position in a CTC volume;
   detecting a polyp tip in a neighborhood of the initial polyp position;
   fitting a local polar coordinate system to a colon surface in the CTC volume based on the detected polyp tip, the local polar coordinate system including a plurality of axes;
   detecting polyp interior and polyp exterior voxels along each of the plurality of axes of the local polar coordinate system; and
   segmenting a boundary of a polyp in the CTC volume by detecting a boundary voxel for each of the plurality of axes of the local polar coordinate system based on the detected polyp interior and polyp exterior voxels.

23. The non-transitory computer readable medium of claim 22, further comprising computer executable instructions defining the step of:
   generating a sub-volume of a polyp region of the CTC volume centered at the initial polyp position.

24. The non-transitory computer readable medium of claim 22, wherein the computer executable instructions defining the step of detecting a polyp tip comprise computer executable instructions defining the steps of:
   detecting polyp tip voxel candidates from colon surface voxels of the CTC using a trained 3D point detector;
   clustering the polyp tip candidate voxels into a plurality of clusters;
   calculating a fitness score for each of the clusters based on probabilities determined by the 3D point detector for the polyp tip voxel candidates in each cluster;
   determining the geometric mean of the cluster with the maximal fitness score; and
   projecting the geometric mean to a voxel on the colon surface.

25. The non-transitory computer readable medium of claim 22, wherein the computer executable instructions defining the step of fitting a local polar coordinate system to a colon surface in the CTC volume based on the detected polyp tip comprise computer executable instructions defining the steps of:
   generating a colon surface model in the CTC volume; and
   fitting the local polar coordinate system to the colon surface model with an origin of the local polar coordinate system at the detected polyp tip.

26. The non-transitory computer readable medium of claim 22, wherein the computer executable instructions defining the step of detecting polyp interior and polyp exterior voxels along each of the plurality of axes of the local polar coordinate system comprise computer executable instructions defining the step of:
   determining a probability of a voxel being in the polyp for each voxel along each axes of the local polar coordinate system using a trained 3D box detector.

27. The non-transitory computer readable medium of claim 26, wherein the computer executable instructions defining the step of segmenting a boundary of a polyp in the CTC volume by detecting a boundary voxel for each of the plurality of axes of the local polar coordinate system based on the detected polyp interior and polyp exterior voxels comprise computer executable instructions defining the steps of:
   detecting a boundary voxel for each axis of the local polar coordinate system based on the probabilities determined by the trained 3D box detector by boosted 1D curve parsing using a trained classifier; and
   stacking the detected boundary voxels to generate the boundary of the polyp.

28. The non-transitory computer readable medium of claim 22, further comprising computer executable instructions defining the step of:
   smoothing the segmented boundary of the polyp.

29. The non-transitory computer readable medium of claim 22, further comprising computer executable instructions defining the step of:
   measuring a size of the polyp based on the segmented boundary of the polyp.

* * * * *